O. PRESTON.
Machine for Making Hollow Wire-Cable.
No. 202,961. Patented April 30, 1878.
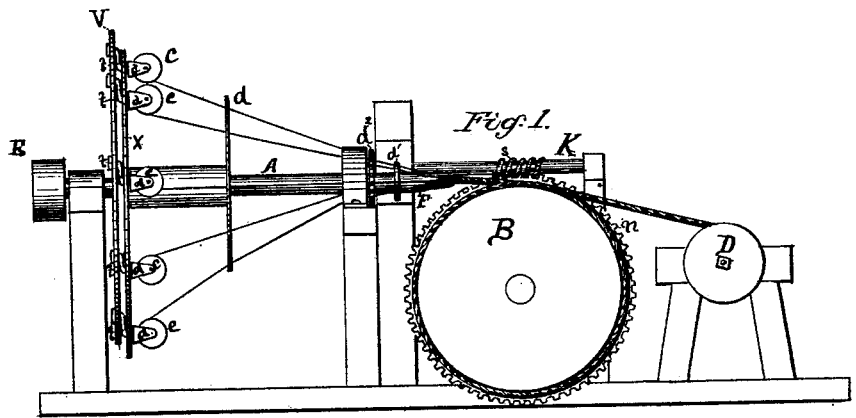
Fig. 1.
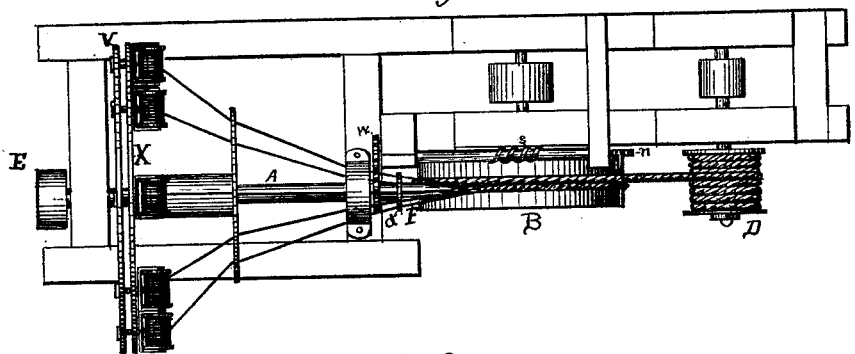
Fig. 2.
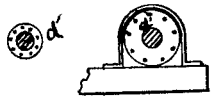
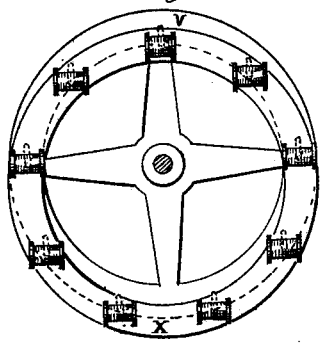
Fig. 3.
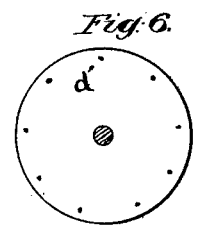
Fig. 6.
Witnesses:
Frank Smith
John Brooks
Inventor
Othniel Preston
By Luse & Johnston
attys.

UNITED STATES PATENT OFFICE.

OTHNIEL PRESTON, OF HORNELLSVILLE, NEW YORK.

IMPROVEMENT IN MACHINES FOR MAKING HOLLOW WIRE CABLE.

Specification forming part of Letters Patent No. 202,961, dated April 30, 1878; application filed August 27, 1877.

*To all whom it may concern:*

Be it known that I, OTHNIEL PRESTON, of Hornellsville, in the county of Steuben and State of New York, have invented certain new and useful Improvements in Hollow Wire-Cable Machines; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Similar letters indicate the same or corresponding parts.

My invention relates to an improvement in machines for the manufacture of hollow or tubular wire cable.

In the drawings, Figure 1 is a side elevation. Fig. 2 is a plan view. Fig. 3 represents the spool-carriage carrying the spools $c$. Figs. 4, 5, and 6 are perforated guide-collars, through which the strands pass, and which serve to converge them around the end of the spindle or core.

A is the shaft or spindle, which serves as an axis for the spool-wheel and guide-collars, and around the point of which the wires unite to form the cable. B is a large tension-wheel which withdraws the rope as it is formed around the end of the spindle. D is a reel or drum for receiving the cable as it is delivered from the tension-wheel B. E is the main pulley, to which the power is applied for driving the machine.

The spools $c$ are loosely attached to the spool wheel or carriage, around which they are located at regular intervals, by means of a double elbow or crank, in order that they may always maintain a position in which their axes are parallel with the horizon.

In order to make their motion uniform, and cause them to maintain the same relative position with respect to each other, a rim whose diameter is equal to that of the spool-carriage is interposed between the spools and crank, the combined weight of which with the spools always keeps the spool end of the crank down, as the carriage revolves, preserving the horizontal position of the spools and imparting an eccentric motion to the rim. By this arrangement the wires are steadily unwound from the spools without twisting.

The tension-wheel B is provided with cogs, and motion is imparted to it by means of a horizontal shaft, K, having a screw-thread, and operated by gearing in connection with shaft A. This wheel is also made to drive reel D by means of a band extending from a pulley on its inner side over a similar pulley on reel D.

In order to operate the machine the spools or bobbins are filled with wire. The strands of wire are passed through the holes or perforations in the rim of the guide-collars, and made to converge around the end of the spindle. The machine is then set in motion, and a hollow rope or cable is thereby formed around the end of the spindle, which operates as a core, and withdrawn therefrom by the tension-wheel B, the motion of which is regulated, by the gearing and screw-shaft K, to correspond with the speed with which the rope is formed, and thence passed to and around the reel or drum D.

It will be observed that the last guide $d'$ is located at the rear of the mandrel F, causing the operation of twisting and uniting the wires into the form of a cable to be commenced and completed around the mandrel before they are delivered from its end, the mandrel operating as a core, from which the hollow cable is withdrawn when formed.

I do not confine the construction of my machine to any specific material, but claim the right to use wood, metal, gutta-percha, or any other suitable material I may deem advisable.

The mandrel or core may also be made removable, so that it may be changed to correspond with the size of the cable desired.

I claim—

1. The axle A, having an elongated point, F, which acts as a core or mandrel to the cable, in combination with the guide-collars and the spool-wheel V, carrying the spools $c$, substantially as described, and for the purpose specified.

2. The axle A, having an elongated point, in combination with the wire-twisting mechanism, the tension-wheel B, and the shaft K, all connected and arranged, substantially as described, and for the purpose specified.

In testimony that I claim the foregoing as my own I affix my signature in presence of two witnesses.

OTHNIEL PRESTON.

Witnesses:
F. M. CRONKRIT,
W. H. WILLET.